Patented Oct. 22, 1940

2,218,584

UNITED STATES PATENT OFFICE 2,218,584

CERAMIC BODY

Taine G. McDougal, Albra H. Fessler, and Karl Schwartzwalder, Flint, Mich., assignors to General Motors Corporation, Detroit, Mich., a corporation of Delaware No Drawing. Application March 31, 1937, Serial No. 134,124

6 Claims. (Cl. 106—12)

This is a continuation in part of our prior application, Serial No. 50,242, filed November 16, 1935.

The invention pertains to spark plug insulator compositions containing chromium oxide and corundum, the former compound acting to control the recrystallization of the latter on firing, to give a fine grained non-porous ceramic product of such a dense and compact structure as to result in an improvement in certain desirable physical characteristics such as thermal conductivity and high frequency electrical resistance. In addition, insulators of this composition are characterized by high mechanical strength, good electrical resistance at all frequencies and at both normal and elevated temperatures, and good resistance to heat shock, all of these properties being required in spark plug insulators.

Products made entirely of calcined alumina are relatively coarse grained when fired to a state of no porosity, the size of the corundum crystals increasing with an increase in temperature. Since the fired mass is composed entirely of corundum crystals of relatively large size the path of electrical breakdown which occurs along the surface of the crystals is relatively short. Hence it is desirable to have a fine grained product containing numerous crystal contacts which increase the breakdown path making the resistance to breakdown greater.

The alumina, when it recrystallizes into alpha corundum, also has a tendency to contain numerous large voids such as gas vesicles or blebs, especially in the center of the individual crystals. This occurs even if the alumina is completely melted and allowed to cool from the molten state. The lower the temperature at which recrystallization takes place, the greater the number of vesicles; the higher the firing temperature the larger the vesicles. This results in a decrease in specific gravity of the fired piece with a resulting decrease in thermal conductivity.

We have found it possible to produce a non-porous fine grained corundum body by the addition of an inorganic compound which enters into solid solution in the alumina. Thus the resulting structure is still characterized by a single homogeneous crystal phase. This phase is corundum into whose crystal lattice the added compound has penetrated, thereby altering the internal structure of the corundum over a range of compositions. There is a gradual corresponding change in the physical properties of the insulator as the corundum structure is modified by the inorganic compound entering into the crystal lattice.

An inorganic compound which functions in the manner desired is chromium oxide. With chromium contents up to 20% very finely crystalline insulators, the crystals containing exceptionally few voids, have been obtained without requiring abnormally high firing temperatures. With chromium contents above 20% the insulators are likewise satisfactory in performance, but practical difficulties in firing render them at present less practical. At the higher temperatures there is a greater tendency for volatilization of the chromium oxide which is undesirable.

In general, we have found it desirable to add no less than on the order of 0.5% of the chromium oxide.

The chromium oxide is preferably free from alkalies in order to eliminate their deleterious effect on the hot dielectric properties of the insulator. The alumina is a 1200° C. calcined aluminum oxide that has been acid treated to remove as much soda as possible.

The oxides are ground and thoroughly mixed. The grinding is preferably carried to a point where all of the material is in the form of a fine powder, for example, one capable of passing through a 325 mesh screen. These materials may be ground in a steel mill since whatever slight contamination may result from grinding would form spinels on firing which would react in the same manner as the inorganic compounds that have been purposely added.

Molding of the insulators may be accomplished with the aid of a suitable binding as described and claimed in the application of Karl Schwartzwalder, Serial No. 3,465, filed January 25, 1935; by pressing in rubber molds as described and claimed in the prior application of Albra H. Fessler and Ralston Russell, Jr., Serial No. 28,630, filed June 27, 1935; by casting, or by any other of the known methods used in forming bodies from non-plastic materials. The first mentioned method has been found to be preferable because the resulting insulator possesses a smooth, glossy surface requiring no glaze.

The formed bodies are then fired to a suitable temperature to produce recrystallization to the extent that the bodies are non-porous, and this usually is accompanied by considerable shrinkage. The firing time and temperature must be controlled as in usual kiln practice so as to secure complete recrystallization and non-porosity and to avoid overfiring with resultant blistering or warpage or other injury to the product. With bodies herein disclosed firing temperatures of about Cone 35, i. e., 1830° C. are adequate.

Whether firing is to be done under oxidizing, reducing or neutral conditions will depend somewhat on the inorganic compound employed. In general, the atmosphere prevailing during that stage of the firing wherein the maturing temperatures are actually approached determines the rate of volatilization of the inorganic compound, and it is desirable to select that atmosphere which will reduce volatilization. The firing temperature likewise affects the color of the resulting product because of chemical reactions which may take place under certain conditions. For the most part, it has been found preferable to employ an oxidizing atmosphere.

The invention is susceptible of modification. It may be found desirable to add suitable ceramic fluxes. Desirable results have been obtained with additions of 1 to 10% flux.

If desired, the ware, such as spark plug insulators, may be composed only in part of the group composition. Thus, either the tip or the butt or the shoulder of a spark plug insulator, may be made of one composition, while the rest of the insulator is made of another composition integrally or otherwise joined to it.

Obviously, the new composition will be found useful in insulators other than those used in spark plugs, in crucibles, and in other highly refractory articles.

We claim:

1. A spark plug insulator made by sintering into a dense, non-porous structure a composition consisting of aluminum oxide together with from 0.5% to 20% chromium oxide.

2. A spark plug insulator made by sintering into a dense, non-porous structure a finely ground non-plastic mixture consisting of aluminum oxide together with 0.5% to 20% of chromium oxide and a small proportion of a ceramic flux.

3. A ceramic body formed by sintering into a dense, non-porous structure a finely ground mixture consisting of aluminum oxide and from .5% to 20% chromium oxide.

4. A spark plug insulator formed by sintering into a dense, non-porous structure, a finely ground non-plastic mixture consisting of aluminum oxide and from .5% to 20% chromium oxide together with up to 10% of a ceramic flux.

5. A ceramic body adapted for use in the form of crucibles, electrical insulators and the like, said body being characterized by high thermal conductivity, high thermal expansion, high electrical resistance at all frequencies and at both normal and elevated temperatures, high mechanical strength, and good resistance to heat shock, made by sintering into a dense, non-porous structure a finely ground non-plastic composition consisting of aluminum oxide together with from .5% to 20% chromium oxide, the fired body consisting of a single, homogeneous crystalline phase —corundum—with the chromium oxide in solid solution in the corundum crystals.

6. The method of making ceramic articles characterized by high thermal conductivity, high thermal expansion, high electrical resistance at both normal and elevated temperatures, high mechanical strength and good resistance to heat shock, which consists in preparing a finely pulverized, non-plastic mixture consisting of aluminum oxide together with from .5% to 20% chromium oxide, forming an article therefrom and firing the body so as to sinter it into a dense, non-porous structure.

TAINE G. McDOUGAL.
ALBRA H. FESSLER.
KARL SCHWARTZWALDER.